(12) United States Patent  
Madden, III. et al.

(10) Patent No.: US 7,431,320 B2  
(45) Date of Patent: Oct. 7, 2008

(54) TRAILER SAFETY HITCH

(76) Inventors: Lum H. Madden, III., 6141 Magnolia Lakes Dr., Olive Branch, MS (US) 38654; Lum H. Madden, Jr., 6141 Magnolia Lakes Dr., Olive Branch, MS (US) 38654

( * ) Notice: Subject to any disclaimer, the term of this patent is extended or adjusted under 35 U.S.C. 154(b) by 366 days.

(21) Appl. No.: 11/306,274

(22) Filed: Dec. 21, 2005

(65) Prior Publication Data

US 2007/0138761 A1 Jun. 21, 2007

(51) Int. Cl.  
*B60D 1/60* (2006.01)

(52) U.S. Cl. .................. 280/507; 280/504; 280/432

(58) Field of Classification Search .................. 280/507  
See application file for complete search history.

(56) References Cited

U.S. PATENT DOCUMENTS

| | | | |
|---|---|---|---|
| 3,876,242 A | 4/1975 | Eaton | |
| D279,665 S | 7/1985 | Landry | |
| 4,783,094 A * | 11/1988 | Sands | 280/515 |
| 4,989,892 A | 2/1991 | Kerins | |
| 5,129,828 A * | 7/1992 | Bass | 439/35 |
| 6,010,144 A * | 1/2000 | Breslin | 280/506 |
| 6,406,052 B1 | 6/2002 | Bale | |
| 6,802,523 B1 | 10/2004 | Profitt | |
| 6,874,804 B2 * | 4/2005 | Reese et al. | 280/477 |
| 6,969,085 B2 * | 11/2005 | Causey, Jr. | 280/507 |
| 2003/0057678 A1 | 3/2003 | Barton | |
| 2008/0023940 A1 * | 1/2008 | Warford | 280/507 |

* cited by examiner

*Primary Examiner*—Lesley D. Morris  
*Assistant Examiner*—Tashiana Adams  
(74) *Attorney, Agent, or Firm*—Advantia Law Group; Michael W. Starkweather; Jason P. Webb

(57) ABSTRACT

A trailer hitch for resisting inadvertent separation of a trailer tongue coupler from a vehicle's hitch ball. The trailer hitch includes a sleeve, a retainer rotatably disposed within the sleeve and including: a rod rotatably disposed within the sleeve, a displacement member coupled to the rod and extending radially therefrom, and a retaining member coupled to the displacement member and resisting inadvertent separation of the trailer tongue coupler from the vehicle's hitch ball when the retaining member is axially disposed adjacent the vehicle's hitch ball. The sleeve includes a shaft coupler removably coupleable to the vehicle. Further, there is a hitch shaft substantially parallel to the sleeve. Also, the displacement member includes a bent rod and the retaining member includes a disk. Still more, the rod is rotatably coupled to the sleeve by a pair of apertures and a bolt.

9 Claims, 3 Drawing Sheets

TRAILER SAFETY HITCH

BACKGROUND OF THE INVENTION

1. Field of the Invention

The present invention relates to trailer hitches, specifically trailer hitches for resisting inadvertent separation of a trailer tongue coupler from a vehicle's hitch ball.

2. Description of the Related Art

In coupling a trailer to a hitch of a vehicle, there are instances of improper securing and or environmental circumstances such as but not limited to resonant bumps that may cause a trailer tongue coupler to detach from a vehicle's hitch ball. Accordingly, a user may suffer damage to a vehicle and/or a trailer and may be subject to enhanced danger and/or liability. Therefore, there are devices in the art intended to more securely couple a trailer tongue to a vehicle's hitch ball.

In particular, U.S. Pat. No. 3,876,242 to Eaton describes a ball member of a trailer hitch is bolted to a tongue piece and is coaxially surrounded at its base by a raised rim integrally formed with the tongue piece. A ball cover is pivotally mounted on the tongue piece and is movable from an open position to a closed position covering the ball. Means are provided for locking the cover in the closed position so that the cover prevents the trailer socket member from disengaging from the ball and together with the rim prevents the ball from disengaging with the tongue piece either vertically or horizontally.

Also, U.S. Pat. No. 4,989,892 to Kerins et al. discloses an improved trailer hitch for coupling a towing vehicle and a trailer. The invention is suitable for accommodating both ball and socket-type couplings and ring and pintle-type couplings. The integral body of the trailer hitch has a rear mount for attaching a body to a towing vehicle, a ball housing with a bore for mounting a removable ball stud, a plate for mating with the attachment means of a towed vehicle, and a passage for connecting a latching arm. There is also a latching arm having a notch, a pin, and a locking means.

What is needed is a trailer hitch that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available trailer hitches. Accordingly, the present invention has been developed to provide a trailer hitch for resisting inadvertent separation of a trailer tongue coupler from a vehicle's hitch ball.

In one embodiment there is a trailer hitch for resisting inadvertent separation of a trailer tongue coupler from a vehicle's hitch ball. The trailer hitch includes a sleeve, a retainer rotatably disposed within the sleeve and including: a rod rotatably disposed within the sleeve, a displacement member coupled to the rod and extending radially therefrom, and a retaining member coupled to the displacement member and resisting inadvertent separation of the trailer tongue coupler from the vehicle's hitch ball when the retaining member is axially disposed adjacent the vehicle's hitch ball.

It may also be that sleeve includes a shaft coupler removably coupleable to the vehicle. Further, there may be a hitch shaft substantially parallel to the sleeve. Also, the displacement member may include a bent rod and/or the retaining member may include a disk. Still more, the rod may be rotatably coupled to the sleeve by a pair of apertures and a bolt.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
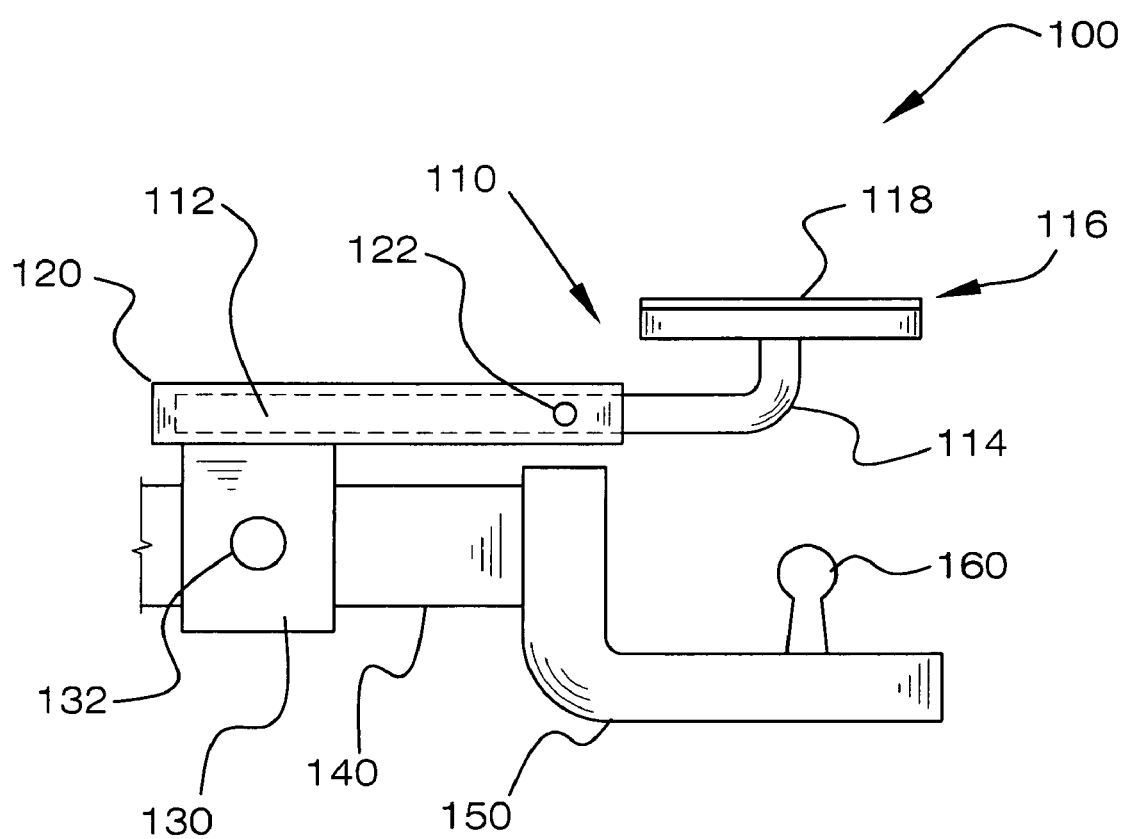
FIG. 1 illustrates a side view of a trailer hitch in an open position according to one embodiment of the invention.
Figure 2:
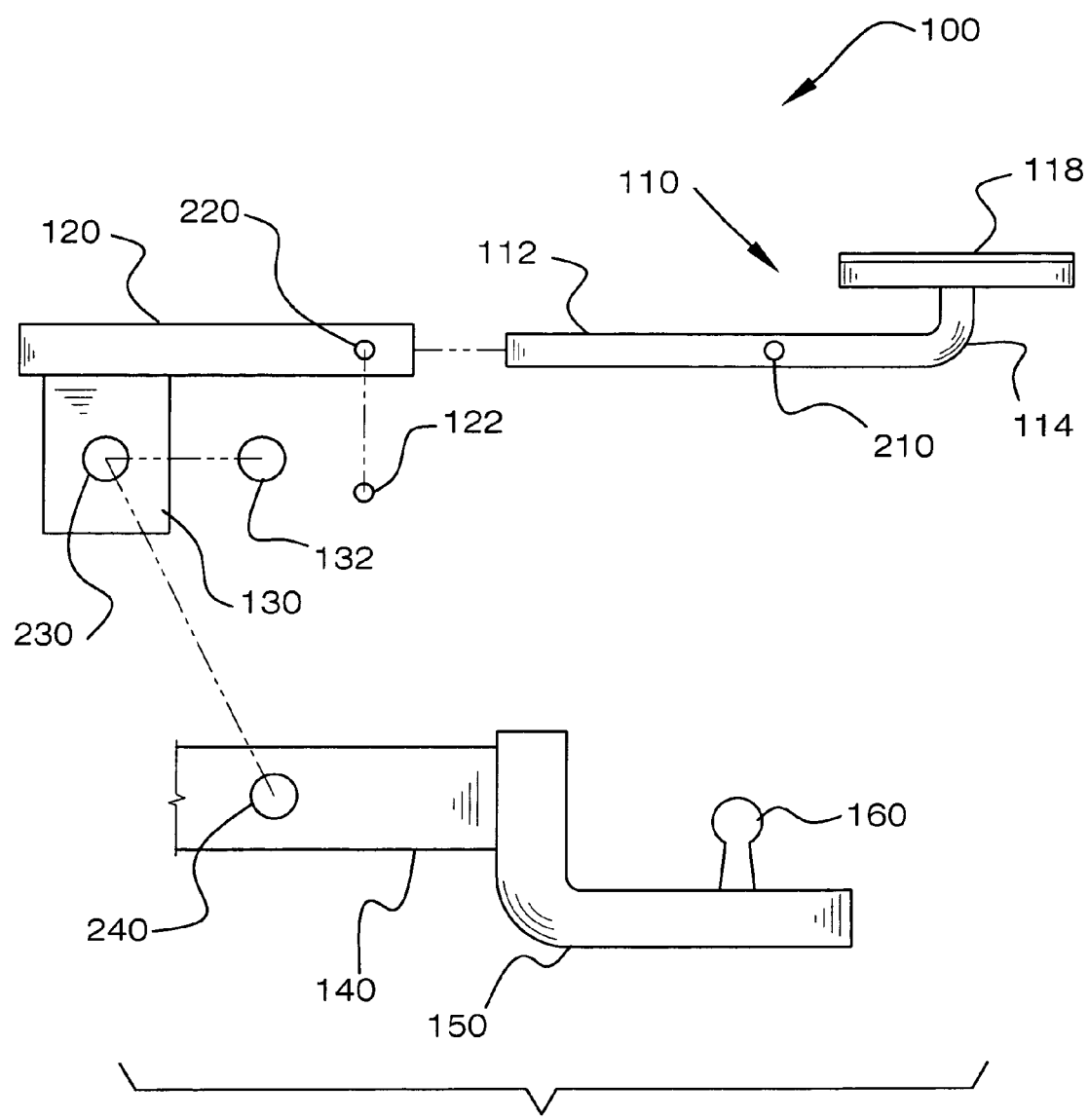
FIG. 2 illustrates and exploded side view of a trailer hitch according to one embodiment of the invention.
Figure 3:
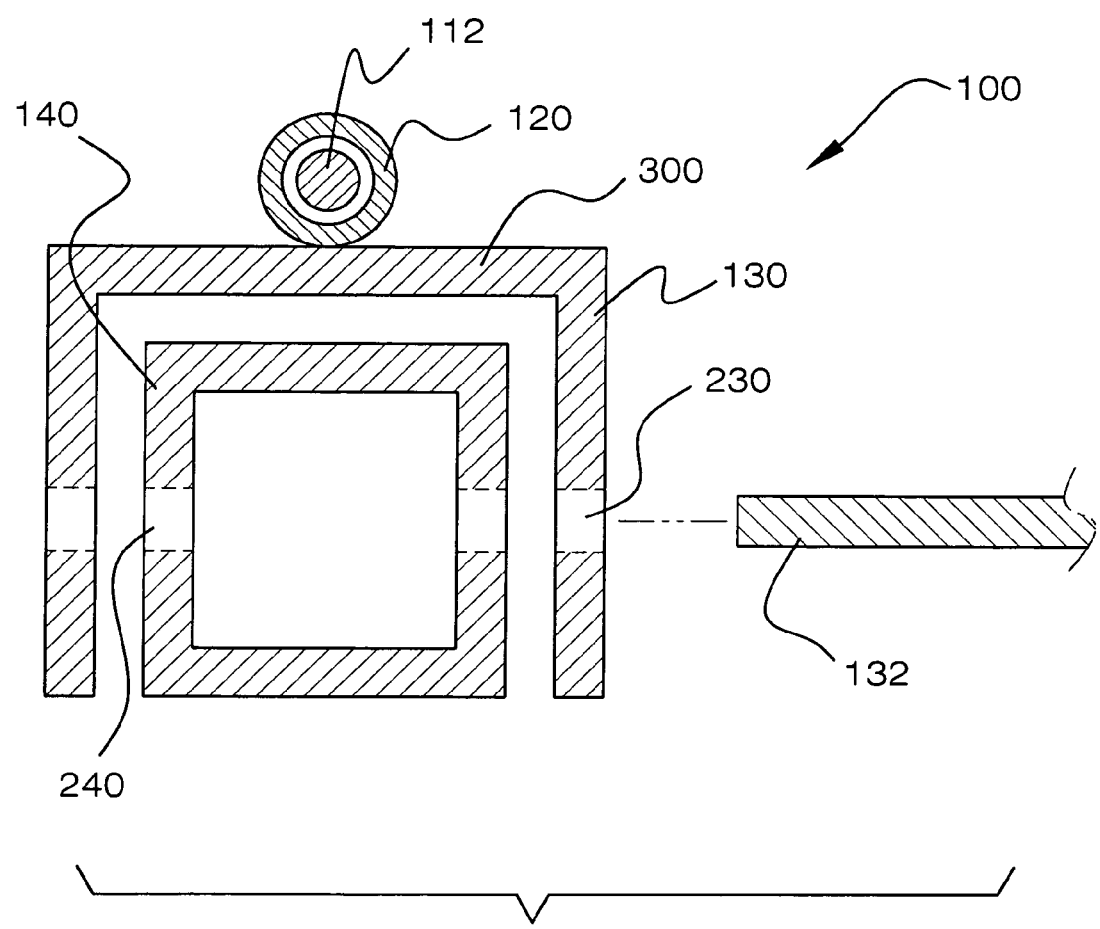
FIG. 3 illustrates a cut-away back view of a trailer hitch according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Turning now to the figures, there is illustrated a trailer hitch 100 according to one embodiment of the invention. There is shown a retainer 110 including a rod 112, a rod aperture 210, a displacement member 114, and a restricting member 116. The retainer 110 is configured to be rotatably disposed within a sleeve 120. The displayed embodiment includes wherein the rod 112 is coaxially disposed within the sleeve and has a maximum radius smaller than of the minimum radius of the sleeve 120.

The displacement member 114 shown includes a bend in the rod 112 thereby displacing the retaining member 116 and altering the symmetry of the retainer 110, thereby enabling the retaining member to be disposed either closer to or farther from a hitch ball 160 depending on the axial orientation of the rod 112.

Additionally, the sleeve 120 is coupled to the hitch shaft 140 by a shaft coupler 130. The shaft coupler illustrated includes a three sided member similar in an interior shape to the exterior shape of the shaft 140. It is preferred that the three sided member match to the shape of the shaft 140. Further, there is shown a shaft aperture 240 and a shaft coupler aperture 230 through which may be placed a shaft coupler bolt 132, thereby locking in relative place the shaft 140 to the shaft coupler 130. Furthermore, as illustrated the shaft 140 is coupled to an extending member 150, wherein the extending member 150 is coupled to a hitch ball 160, opposite 140.

More, the shaft coupler 130 is coupled to the sleeve 120, preferably by welding. Additionally, it is preferred that each of the sleeve, shaft, and/or shaft coupler are substantially parallel.

There is also shown a sleeve aperture 220 and a rod aperture 210 through which may be disposed a sleeve bolt 122. In the illustrated example, the sleeve bolt 122 may be disposed through each of the sleeve aperture 220 and rod aperture 210 when the rod 112 is in each of a plurality of axial positions. In one such axial position the displacement member 114 is oriented to direct the retaining member 116 away from the hitch ball 160, thereby not substantially restricting access of a hitch to the hitch ball 160. In another such axial position, the displacement member 114 is oriented to direct the retaining member 116 towards the hitch ball 160, thereby substantially restricting access of a hitch to the hitch ball 160 such that a hitch thereon mounted may be unable to come free from the hitch ball 160. In addition, as illustrated the retaining member 116 includes a protective layer 118, wherein the protective 118 is configured to support the retaining member 116 during prolonged use.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the retaining member shown is a disk, the retaining member may be of any obstructing shape, including but not limited to obstructing shapes that are cubes and/or other polygons, and irregular shapes.

Finally, it is envisioned that the components of the device may be constructed of a variety of materials, including but not limited to metals, plastics, ceramics, composites, and fibers.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A trailer hitch for resisting inadvertent separation of a trailer tongue coupler from a vehicle's hitch ball, comprising:
   a sleeve; and
   a retainer rotatably disposed within the sleeve and including:
      a rod rotatably disposed within the sleeve;
      a displacement member coupled to the rod and extending radially therefrom; and
      a retaining member coupled to the displacement member and resisting inadvertent separation of the trailer tongue coupler from the vehicle's hitch ball when the retaining member is axially disposed adjacent the vehicle's hitch ball.

2. The trailer hitch of claim 1, wherein the sleeve includes a shaft coupler removably coupleable to the vehicle.

3. The trailer hitch of claim 1, further comprising a hitch shaft substantially parallel to the sleeve.

4. The trailer hitch of claim 2, wherein the displacement member includes a bent rod and the retaining member includes a disk.

5. The trailer hitch of claim 4, wherein the rod is rotatably coupled to the sleeve by a pair of apertures and a bolt.

6. A trailer hitch for resisting inadvertent separation of a trailer tongue coupler from a vehicle's hitch ball, consisting essentially of:
   a sleeve; and
   a retainer rotatably disposed within the sleeve and including:
      a rod rotatably disposed within the sleeve;
      a displacement member coupled to the rod and extending radially therefrom; and
      a retaining member coupled to the displacement member and resisting inadvertent separation of the trailer tongue coupler from the vehicle's hitch ball when the retaining member is axially disposed adjacent the vehicle's hitch ball.

7. The trailer hitch of claim 6, wherein the sleeve includes a shaft coupler removably coupleable to the vehicle.

8. The trailer hitch of claim 7, wherein the displacement member includes a bent rod and the retaining member includes a disk.

9. The trailer hitch of claim 8, wherein the rod is rotatably coupled to the sleeve by a pair of apertures and a bolt.

* * * * *